(12) United States Patent
Hashiguchi

(10) Patent No.: US 7,478,433 B2
(45) Date of Patent: Jan. 13, 2009

(54) PROGRAM EXECUTION SYSTEM HAVING AUTHENTICATION FUNCTION

(75) Inventor: Kazuya Hashiguchi, Nara (JP)

(73) Assignee: Panasonic Corporation, Osaka (JP)

( * ) Notice: Subject to any disclaimer, the term of this patent is extended or adjusted under 35 U.S.C. 154(b) by 676 days.

(21) Appl. No.: 10/871,226

(22) Filed: Jun. 18, 2004

(65) Prior Publication Data

US 2005/0028007 A1 Feb. 3, 2005

(30) Foreign Application Priority Data

Jun. 19, 2003 (JP) ............................. 2003-174352

(51) Int. Cl.
*H04L 9/00* (2006.01)

(52) U.S. Cl. .................. 726/26; 713/100; 713/191; 705/59; 705/67; 717/171; 717/172; 717/173

(58) Field of Classification Search ................ 713/187, 713/189, 1, 100, 191; 717/173, 168, 171, 717/172; 726/4, 27, 17, 26; 709/221, 223; 705/59, 67
See application file for complete search history.

(56) References Cited

U.S. PATENT DOCUMENTS

| | | | | |
|---|---|---|---|---|
| 5,835,911 A * | 11/1998 | Nakagawa et al. | .......... | 707/203 |
| 6,055,636 A * | 4/2000 | Hillier et al. | ................. | 726/34 |
| 6,134,593 A * | 10/2000 | Alexander et al. | .......... | 709/229 |
| 6,327,659 B2 * | 12/2001 | Boroditsky et al. | ......... | 713/182 |
| 6,341,373 B1 * | 1/2002 | Shaw | .......................... | 717/173 |
| 6,502,193 B1 * | 12/2002 | Barber | .......................... | 726/4 |
| 6,615,191 B1 * | 9/2003 | Seeley | .......................... | 705/54 |
| 6,715,085 B2 * | 3/2004 | Foster et al. | ................... | 726/27 |
| 6,754,895 B1 * | 6/2004 | Bartel et al. | ................. | 717/171 |
| 7,003,767 B2 * | 2/2006 | Larkin | ........................ | 717/172 |
| 7,100,203 B1 * | 8/2006 | Tosey | .......................... | 726/17 |
| 7,308,450 B2 * | 12/2007 | Saika | .......................... | 707/10 |
| 7,356,707 B2 * | 4/2008 | Foster et al. | ................. | 713/189 |
| 7,389,504 B2 * | 6/2008 | Kawano et al. | .............. | 717/171 |
| 2002/0120578 A1 * | 8/2002 | Sy | .............................. | 705/59 |
| 2002/0120579 A1 * | 8/2002 | Kawaguchi et al. | ........... | 705/59 |
| 2002/0120725 A1 * | 8/2002 | DaCosta et al. | ............. | 709/221 |
| 2003/0055935 A1 * | 3/2003 | Tarrant et al. | ............... | 709/223 |
| 2005/0138401 A1 * | 6/2005 | Terao et al. | ................. | 713/189 |

FOREIGN PATENT DOCUMENTS

| | | |
|---|---|---|
| JP | 06-259353 | 9/1994 |
| JP | 11-298552 | 10/1999 |
| JP | 2002-027558 | 1/2002 |
| JP | 2002-044732 | 2/2002 |

* cited by examiner

*Primary Examiner*—Carl Colin
*Assistant Examiner*—Shanto M Abedin

(57) ABSTRACT

When having received an instruction that a program should be activated, the program execution system judges whether or not the program to be activated has been updated. When the activation of the program has resulted from an update of the program, an authentication process is performed with the use of the authentication information inputted during the immediately preceding activation process.

3 Claims, 10 Drawing Sheets

FIG.2

(CLIENT APPARATUS)

| APPLICATION NAME (2311) | UPDATE DATE AND TIME (2312) | 2310 |
|---|---|---|
| APPLI-A | 2003/02/07  12:45:33 | |

| PROGRAM NAME (2351) | UPDATE DATE AND TIME (2352) | 2350 |
|---|---|---|
| A-PROG0 1 | 2003/02/07  12:45:33 | |
| A-PROG0 2 | 2003/02/05  21:22:12 | |
| . . . | . . . | |

FIG.3

(SERVER APPARATUS)

| APPLICATION NAME | UPDATE DATE AND TIME |
|---|---|
| APPLI-A | 2003/02/08 19:26:04 |

| PROGRAM NAME | UPDATE DATE AND TIME |
|---|---|
| A-PROG0 1 | 2003/02/07 12:45:33 |
| A-PROG0 2 | 2003/02/08 19:26:04 |
| ... | ... |

PROGRAM EXECUTION SYSTEM HAVING AUTHENTICATION FUNCTION

BACKGROUND OF THE INVENTION

1. Field of the Invention

The present invention relates to updating processes of a program that require user authentication when the program is activated and particularly relates to a technique to improve the level of convenience during execution of the programs after being updated.

2. Description of the Related Art

Some kinds of application software, when being activated, require the user to input a password or the like, in order to authenticate if the user is authorized to use the software. The purpose of this requirement is to prevent the data and the like dealt with in the application from being disclosed to the generic public.

Revised versions of programs for different kinds of application software are provided in order to correct errors and add additional functions or the like. Every time a revised version is provided, users need to update the application software in use from the current version to the revised version.

In order to update a piece of application software, users need to take the trouble of checking whether a revised version of the application in use is available or not.

In recent years, to save the users trouble, some kinds of application software inform each user that there is a revised version when the application software is activated, so that the user is able to perform an update. This way, the users are able to find out that there is a revised version without taking the trouble of checking, and to update the application software.

As a different example, when disconnection occurs in the network between a user's terminal and the server, some network systems include a network server that is capable of automatically detecting the disconnection of the line so as to have the disconnected terminal re-connected to the network without bothering the user (See Patent Document 1).

During an updating process of a piece of application software, however, the user's trouble cannot be dispensed with, unlike the case of the re-connection of network systems mentioned above. In other words, when an updated application is re-activated, the user needs to take the trouble of inputting the password or the like, again.

More specifically, in order to update a piece of application software, the application in operation needs to be at first terminated before being updated, and then the application should be re-activated after the update. The reason for this is because, in principle, it is not possible to update a piece of application software while the application is being executed.

Even if the application is automatically re-activated after an update so that the user is saved from the trouble of re-activating the application, the user still needs to input a password or the like for the purpose of authentication.

It means that the password is once inputted for an authentication process, but when an update is performed and the application is re-activated, the user again has to take the trouble of performing authentication for the second time. Because of this trouble, the level of convenience in updating processes of applications is lowered, and further, the user experiences the inconvenience of having to stop the task on which he/she has originally been working.

Patent Document 1

Japanese Unexamined Patent Application Publication No. 6-259353

SUMMARY OF THE INVENTION

An object of the present invention is to provide a program execution system which, when a piece of software for an application is updated after the application which requires authentication of the user is activated, enables the user to resume the original task on which he/she had been working immediately after the update, without taking the trouble of inputting information for authentication.

In order to achieve the abovementioned object, the present invention provides a program execution system having an authentication function, comprising: a storing unit operable to store therein one or more pieces of authentication information; an instruction obtaining unit operable to obtain an activation instruction to activate a program; an updating unit operable to update the program partially or entirely; a judging unit operable to judge whether or not the obtained activation instruction has resulted from an update of the program performed by the updating unit; an authenticating unit operable to, when the judging unit has judged in the affirmative, check whether or not a corresponding one of the pieces of authentication information is authentic; and an executing unit operable to execute the program in a case where the checked piece of authentication information has been confirmed to be authentic.

Further, the present invention provides a program execution system having an authentication function, comprising: a storing unit operable to store therein one or more pieces of authentication information; an instruction obtaining unit operable to obtain an activation instruction to activate a program; an updating unit operable to update the program partially or entirely; a judging unit operable to judge whether or not the obtained activation instruction has resulted from an update of the program performed by the updating unit; and an authentication and execution unit operable to, (i) when the judging unit has judged in the affirmative, execute the program and (ii) when the judging unit has judged in the negative, obtain a piece of authentication information from outside of the program execution system and further execute the program in a case where the obtained piece of authentication information has been confirmed to be authentic.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 2 shows the structure and an example of the update information in the client apparatus;

FIG. 3 shows the structure and an example of the update information in the server apparatus;

DESCRIPTION OF THE PREFERRED EMBODIMENTS

General Outline

Having received an instruction that a program should be activated, the program execution system of the present invention judges if the program to be activated has been updated or not, in other words, if the received instruction to activate the program has resulted from an update of the program. When the program is activated immediately after an update, the program execution system omits the normal authentication process.

According to the present embodiment, the program after an update is immediately and automatically re-activated.

Structure

Figure 1:
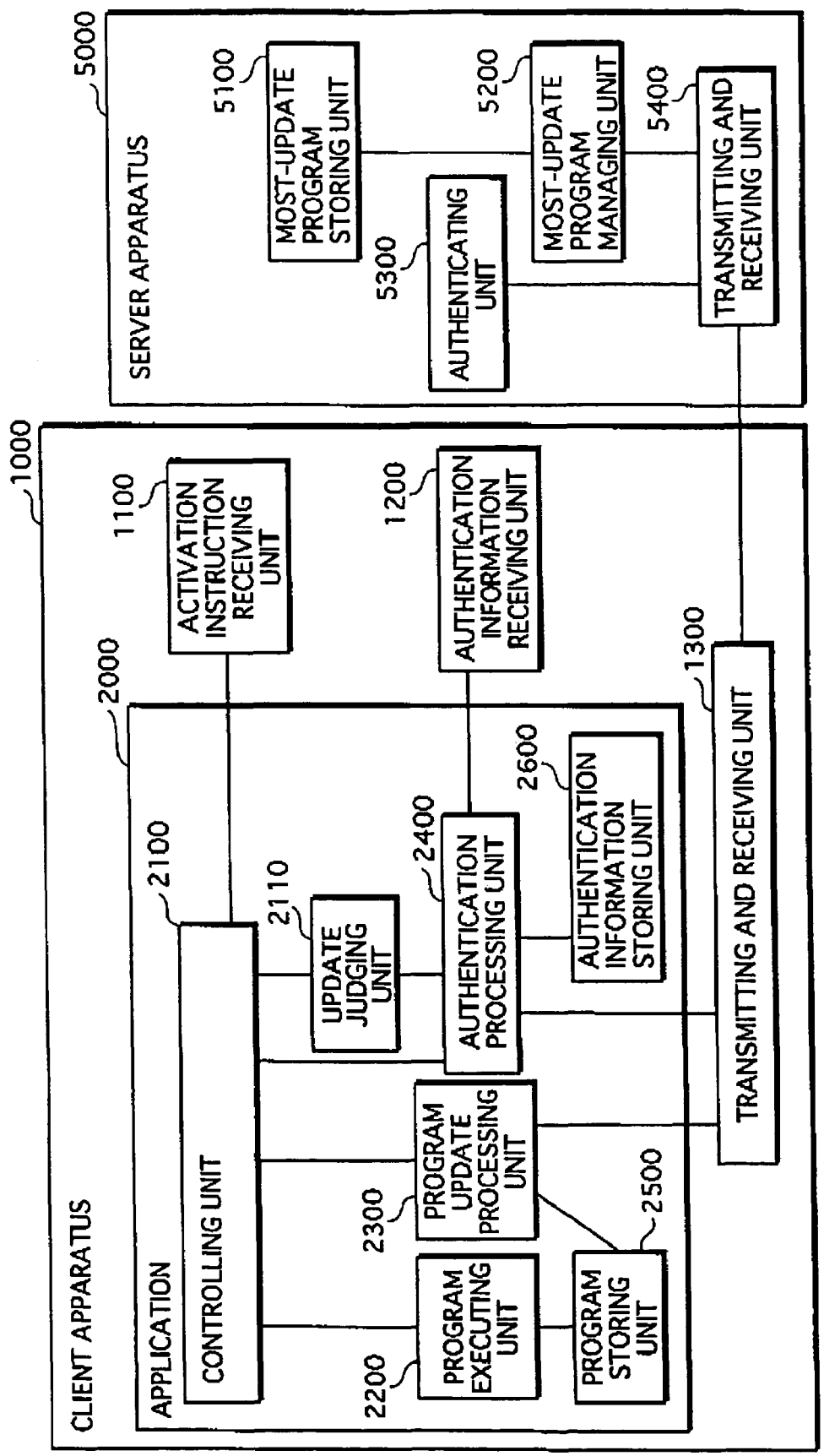
FIG. 1 is a functional block diagram that shows the structure of the program execution system.

The following describes the program execution system of the present invention, with reference to FIG. 1.

FIG. 1 is a functional block diagram that shows the structure of the program execution system.

In the drawing, the program execution system comprises a client apparatus 1000 and a server apparatus 5000, which are connected with each other via a network; however, actually a plurality of client apparatuses 1000 are connected with the server apparatus 5000.

The client apparatus 1000 includes an activation instruction receiving unit 1100, an authentication information receiving unit 1200, a transmitting and receiving unit 1300, and an application 2000.

Here, the client apparatus 1000 has a display device as well as input devices such as a key board, a mouse, and the like, and also has a user interface function which is normally included in computers. It should be noted that these functions are not shown in the drawing.

The activation instruction receiving unit 1100 is operable to, at first, receive an instruction from a user to activate the application 2000, and pass the control to the application. For example, the user issues an instruction to activate the application 2000 by clicking the icon of the application 2000 displayed on the display device of the client apparatus 1000.

The authentication information receiving unit 1200 is operable to ask the user to input authentication information such as a password and to receive the authentication information. For example, the authentication information receiving unit 1200 has a window displayed in which a user ID and a password can be inputted.

The transmitting and receiving unit 1300 is operable to exchange data with the server apparatus 5000.

The application 2000 is a piece of software for the purpose of performing a specific task, such as word processing software or database software.

The application 2000 includes: a controlling unit 2100; an update judging unit 2110; a program executing unit 2200; a program update processing unit 2300; an authentication processing unit 2400; a program storing unit 2500; and an authentication information storing unit 2600.

The controlling unit 2100 is operable to control the execution of the application. More specifically, the controlling unit 2100 performs the initial process of, for example, ensuring resources required for the execution of the application, and then executes the application by issuing instructions to different functional units.

The controlling unit 2100 starts operating in response to an activation instruction from the activation instruction receiving unit 1100. When the application is re-activated after an update, the controlling unit 2100 starts operating in response to an activation instruction from a separately-created process, which is to be described later.

The update judging unit 2110 is operable to judge whether or not any of the programs to realize the functions of the application have been updated. In other words, the update judging unit 2110 judges whether the activation instruction which the controlling unit 2100 has received is received from the activation instruction receiving unit 1100 or received from the separately-created process to be described later. In other words, the update judging unit 2110 judges whether or not the activation instruction is issued after one or more of the programs have been updated.

Depending on the judgment result by the update judging unit 2110, the controlling unit 2100 changes the instructions to be issued to different functional units and the order in which those instructions are issued.

The program executing unit 2200, which is one of the functional units, is operable to execute each of the programs that realize the specific functions of the application.

The programs are stored in the program storing unit 2500. The program storing unit 2500 is operable to manage and store therein the programs. The program storing unit 2500 is included in, for example, an external memory and exists irrespective of whether the application has been activated or terminated. As additional information, each of the programs of the present embodiment is an executable module, which is a so-called object module.

The program update processing unit 2300 is operable to manage the update history of the programs stored in the program storing unit 2500 and to update each of the programs.

To manage the update history of the programs means to store update information indicating the date and time at which each of the programs has been updated and to judge whether a revised version of each of the programs is available or not. The judgment is made based on a most-updated piece of program update information received from the server apparatus 5000, which is to be described later, and the update information being stored in the program update processing unit 2300.

To update each program means to request a most-updated program from the server apparatus 5000, receive the most-updated program, and replace the program stored in the program storing unit 2500 with the most-updated program.

The authentication processing unit 2400 is operable to receive the authentication information, such as a password inputted by the user, from the authentication information receiving unit 1200, request the server apparatus 5000 to perform authentication, as well as request the authentication information storing unit 2600 to store the authentication information.

The authentication information storing unit 2600 is operable to store therein and manage the authentication information received from the authentication processing unit 2400.

It is acceptable as long as the authentication information storing unit 2600 exists when the authentication information is stored at the time of an activation process for the first time and is referable when the application is re-activated after termination of the first activation of the application. In the present embodiment, the authentication information storing unit 2600 is a file. The name of the file is determined for each system, so that it is possible to refer to the file according to the file name. It should be noted that, when there are a plurality of applications, it is acceptable to provide a different file name for each of the applications.

The file is generated during the process of storing the authentication information at the time of an activation process for the first time, and deleted during the process of terminating the application which has been activated for the second time. When the user inputs the authentication information, the authentication information is written into the file.

As a result, when the application is activated for the first time, there exists no file that stores therein authentication information, and when the application is re-activated after an update, there exists a file in which authentication information is written.

The authentication information written into the file is encrypted to ensure security. It should be noted, however, that explanation on the encryption and decryption processes is omitted in the description below.

The following describes the server apparatus 5000.

The server apparatus 5000 comprises: a most-updated program storing unit 5100; a most-updated program managing unit 5200; an authenticating unit 5300; and a transmitting and receiving unit 5400.

The most-updated program storing unit 5100 is operable to store therein most-updated programs of the application that is in operation in the client apparatus 1000. In other words, the most-updated program storing unit 5100 stores therein a revised version of each of the programs in which, for example, an error in an old application is corrected or an additional function is included.

The number of applications stored in the most-updated program storing unit 5100 does not necessarily have to be one. It is acceptable that the most-updated program storing unit 5100 stores therein programs for a plurality of applications. In the similar manner, the number of the applications in the client apparatus does not have to be one, either. It is acceptable to use a plurality of applications in the client apparatus.

The most-updated program managing unit 5200 is operable to manage update histories of the programs stored in the most-updated program storing unit 5100 and to transmit the update information of the programs as well as each of the programs read from the most-updated program storing unit 5100, in response to a request from the client apparatus 1000.

The authenticating unit 5300 is operable to judge whether or not authentication information transmitted from the client apparatus 1000 indicates the right to use the application. There are various methods of authentication including biometric identification; however, in the present embodiment, a user ID and a password are used as the means of authentication. A user ID is assigned to each user, and a password, which is a character string that is known only to the user, as well as the user ID are stored in a memory (not shown in the drawing) inside the authenticating unit 5300. When an authentication process is performed, the user is asked to input the combination of the user ID and the password, so that the authenticating unit 5300 receives the combination from the client apparatus 1000 and performs an authentication process.

The transmitting and receiving unit 5400 is operable to exchange data with the client apparatus 1000.

The operational functions of the client apparatus 1000 and the server apparatus 5000 are realized when a CPU executes a program stored in a memory or a hard disk (not shown in the drawing) in each apparatus.

Data

The following explains some of the principal data used in the program execution system, with reference to FIGS. 2 and 3.

FIG. 2 shows the structure and an example of the update information in the client apparatus.

The application is made up of a plurality of programs. The update information shows the update histories of the application and those programs.

The update information is made up of two kinds of information: one is application update information 2310 and the other is program update information 2350. These pieces of data are stored in a memory (not shown in the drawing) inside the program update processing unit 2300.

The application update information 2310 is made up of an application name 2311 and an update date and time 2312.

In the example shown in the drawing, the application identified with the application name "APPLI-A" has been updated most recently at 12:45:33 on Feb. 7, 2003 as shown by the update date and time, reading "2003/02/07 12:45:33". The update date and time 2312 is updated not only when the whole application has been updated, but also when part of the application, i.e. some of the programs, has been updated.

The program update information 2350 is made up of program names 2351 and update dates and times 2352.

The program names 2351 are the names of the programs that constitute the application identified with the application name 2311. The update dates and times 2352 each indicate a date and time at which the program identified with a corresponding one of the program names 2351 has been updated most recently. Here, "the date and time at which the program has been updated most recently" denotes a date and time at which the program is updated in the server apparatus, and not the date and time at which the program is updated in the client apparatus. In other words, it is a date and time at which a revised version is made.

In the example shown in the drawing, the application identified with the application name "APPLI-A" is made up of programs identified with the program names such as "A-PROG01" "A-PROG02", and so on. The update dates and times of these programs are "2003/02/07 12:45:33" and "2003/02/05 21:22:12", respectively. Since the update date and time 2352 of the program identified with the program name "A-PROG01" is the same as the update date and time 2312 of the application identified with the application name "APPLI-A", it is understood that, among these programs, the program identified with the program name "A-PROG01" has been updated most recently.

FIG. 3 shows the structure and an example of the update information in the server apparatus.

The update information in the server apparatus has the same structure as the update information in the client apparatus.

Specifically, the update information is made up of two kinds of information: one is application update information 5210 and the other is program update information 5250.

The application update information 5210 is made up of an application name 5211 and an update date and time 5212. The program update information 5250 is made up of program names 5251 and update dates and times 5252. The definition of each of the items is the same as the update information in the client apparatus.

The update information is stored in a memory within the most-updated program managing unit 5200 (not shown in the drawing).

In the example shown in the drawing, a date and time at which the application identified with the application name "APPLI-A" has been updated most recently is 19:26:04 on Feb. 8, 2003 as shown by the update date and time, reading "2003/02/08 19:26:04".

The update dates and times of the programs that constitute the application identified with the application name "APPLI-A" and are identified with the program names, such as "A-PROG01" "A-PROG02" and so on, are "2003/02/07 12:45:33" and "2003/02/08 19:26:04", respectively.

Operation

The following describes the operation of the above-mentioned program execution system, with reference to FIGS. 4 through 7.

Figure 4:
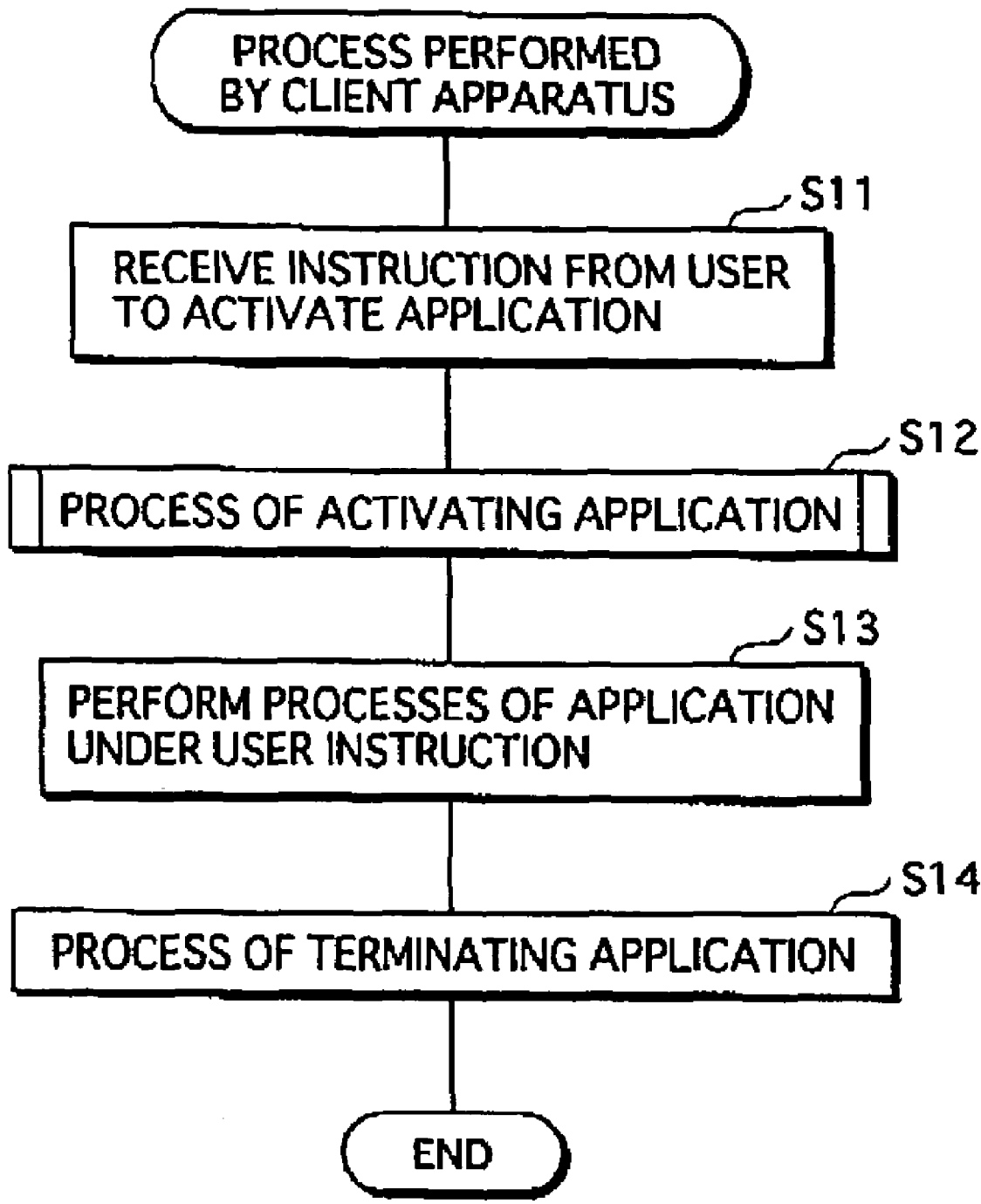
FIG. 4 is a flow chart showing the procedure of executing the application 2000 on the client apparatus 1000.

FIG. 4 is a flow chart showing the procedure of executing the application 2000 on the client apparatus 1000.

First, the user clicks on an icon displayed on the display device of the client apparatus 1000. There is a prearrangement that when this icon is clicked, the application 2000 is activated.

The program execution system of the present invention could also comprise an activating unit. The activating unit can include the controlling unit 2100, the update judging unit 2110, the authentication processing unit 2400, the authentication information receiving unit 1200, and/or the authenticating unit 5300.

The activation instruction receiving unit 1100 detects that the specific icon has been clicked (Step S11), and informs the controlling unit 2100 of the application 2000 that the icon has been clicked.

Having been instructed that the application should be activated, the controlling unit 2100 performs an activation process for the application (Step S12). During this activation process, the controlling unit 2100 updates part or all of the programs and automatically re-activates the application. The details of this activation process will be explained later.

The activated application performs, in accordance with the user's instruction, a specific task such as word processing or spreadsheet operation, which are the original purposes of the application. (Step S13).

When the task is finished, the user issues an instruction to the application that it should be terminated.

Having received the instruction, the application performs a termination process such as saving data or closing windows, and the like (Step S14).

Figure 5:
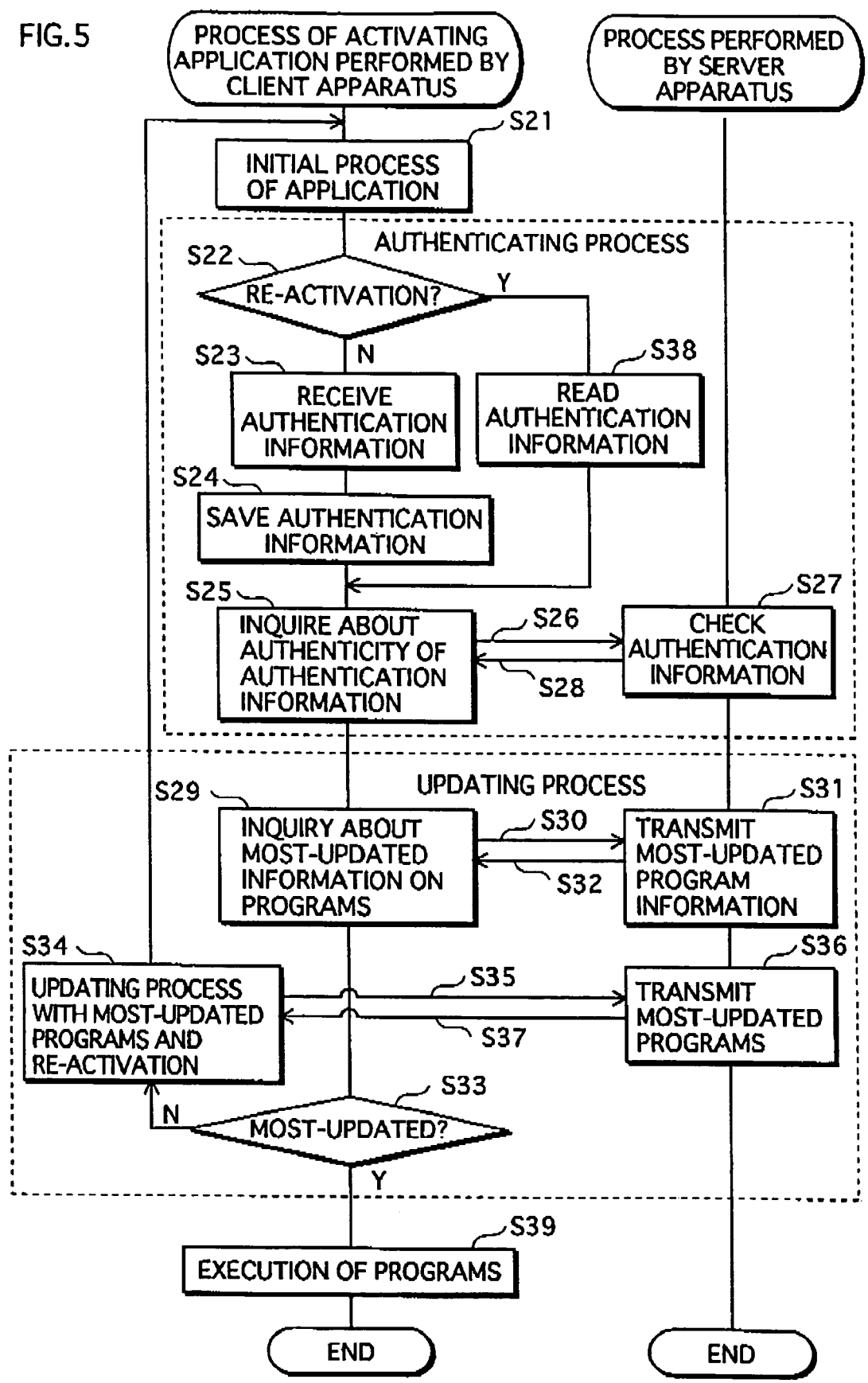
FIG. 5 is a flow chart showing the activation process of an application.

FIG. 5 is a flow chart showing the activation process of the application.

Having received an activation instruction, the controlling unit 2100 performs an initial process for the execution of the application (Step S21). More specifically, the controlling unit 2100 ensures resources such as memories and devices required for the execution of the application.

When the initial process is completed so that the environment for executing the application is prepared, a user authentication process is performed.

The controlling unit 2100 requests the update judging unit 2110 to judge if the activation instruction is issued after updates of one or more of the programs.

Having received the request, the update judging unit 2110 inquires of the authentication processing unit 2400 whether or not authentication information is stored in the authentication information storing unit 2600, in other words, whether the specified file exists or not.

Since the activation instruction this time is an activation instruction for the first time, the specified file does not exist. Accordingly, the authentication processing unit 2400 replies to the update judging unit 2110 that the specified file does not exist, i.e. no authentication information is stored.

Having received the reply that no authentication information is stored, the update judging unit 2110 judges that the activation instruction is not an activation instruction issued after an update, in other words, the activation instruction is an activation instruction issued for the first time, and returns the judgment result to the controlling unit 2100 (Step S22: N).

Having received the reply from the update judging unit 2110 that the activation instruction is not an activation instruction issued after an update, the controlling unit 2100 instructs the authentication processing unit 2400 to check the authentication information.

Having received the instruction to check the authentication information, the authentication processing unit 2400 requests the authentication information receiving unit 1200 to obtain authentication information so as to receive the authentication information from the user (Step S23).

Figure 6:
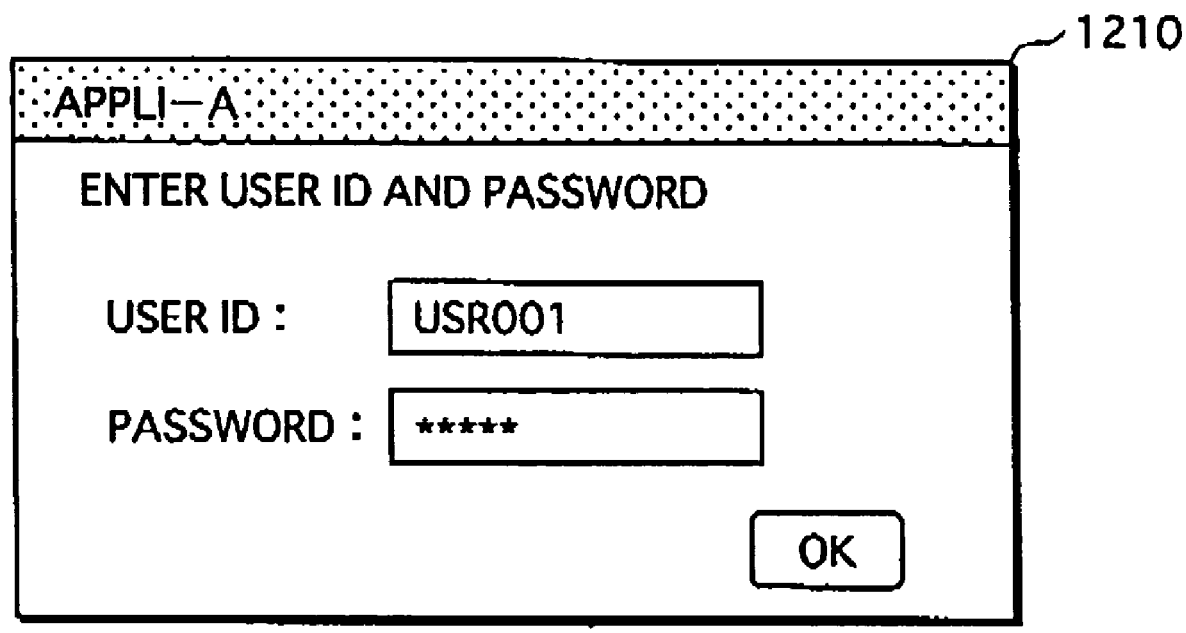
FIG. 6 shows the structure and an example of the window in which the user is asked to input authentication information.

More specifically, the authentication information receiving unit 1200 that has received the request has a window displayed on the display device in which the user is asked to input authentication information and returns the authentication information inputted by the user to the authentication processing unit 2400. FIG. 6 shows the structure and an example of the window in which the user is asked to input authentication information. A window like the one shown in FIG. 6 is displayed on a display device. In the example shown in the drawing, a user ID "USR001" and a password of five characters are inputted. The password has actually been inputted as "abc12", but is displayed as "*****".

The authentication processing unit 2400 stores the authentication information received from the authentication information receiving unit 1200 into the authentication information storing unit 2600 (Step S24). Specifically, the authentication processing unit 2400 makes a file and stores the authentication information in the file.

The authentication processing unit 2400 then requests the server apparatus 5000 to authenticate the authentication information, via the transmitting and receiving unit 1300 (Step S25).

When making the request, the authentication processing unit 2400 transmits the authentication information and the application name 2311 (See FIG. 2) (Step S26). In the example shown in the drawing, the application name 2311 "APPLI-A", the user ID "USR001", and the password "abc12" are transmitted. It should be noted that any application name is acceptable as long as it represents the application. It is acceptable that an application name is expressed with numerals or the like. (The same applies to the following explanation).

The authenticating unit 5300 in the server apparatus 5000 receives the authentication information and other pieces of information transmitted from the client apparatus 1000 via the transmitting and receiving unit 5400.

Having received the authentication information and other pieces of information, the authenticating unit 5300 judges whether or not the user identified with the transmitted user ID is authorized to use the application identified with the transmitted application name. When the user is authorized to use the application, the authenticating unit 5300 judges whether the password is correct or not (Step S27). When the user is authorized to use the application and the password is correct, the authenticating unit 5300 informs the client apparatus 1000 that the authentication has successfully been performed via the transmitting and receiving unit 5400. When the user is not authorized to use the application or the password is not correct, the authenticating unit 5300 informs the client apparatus 1000 that the authentication has failed (Step S28).

Having received the result of the authentication from the server apparatus 5000, the authentication processing unit 2400 forwards the result to the controlling unit 2100.

Having received a result of the authentication that indicates an authentication failure, the controlling unit 2100 performs a process of informing the user of the authentication failure and aborts the activation process. (This process is not shown in the flow chart.)

Having received a result of the authentication that indicates an authentication success, the controlling unit 2100 performs an updating process of the program.

The updating process of the program is performed as a result of the controlling unit 2100 requesting the program update processing unit 2300 to perform an update.

Having received the request for performing a program updating process from the controlling unit 2100, the program update processing unit 2300 requests, via the transmitting and receiving unit 1300, the server apparatus 5000 to provide update information of the application, i. e. information to be used in the judgment of whether a revised version is available or not (Step S29).

At the time of making the request, the program update processing unit 2300 transmits the application name (Step S30)

The transmitted application name is forwarded to the most-updated program managing unit 5200 in the server apparatus 5000 via the transmitting and receiving unit 5400.

Having received the application name, the most-updated program managing unit 5200 reads update information of an application identified with the received application name from an internal memory, and transmits the update information to the program update processing unit 2300 within the client apparatus 1000 (Step S31).

The transmitted update information is made up of the application update information 5210 and the program update information 5250 (Step S32; See FIG. 3).

Having received the update information, the program update processing unit 2300 compares the received updated information with the update information stored in the internal memory of the program update processing unit 2300, so as to judge whether an update is necessary or not (Step S33).

More specifically, the program update processing unit 2300 compares the update date and time 2312 in the application update information 2310 within the stored update information (See FIG. 2) with the update date and time 5212 in the application update information 5210 within the received update information (See FIG. 3). When the update date and time 5212 within the received update information is newer than the update date and time 2312 within the stored update information, the program update processing unit 2300 judges that an update is required.

In the example shown in the drawing, the update date and time 5212 within the received update information "2003/02/08 19:26:04" is newer than the update date and time 2312 within the stored update information "2003/02/07 12:45:33"; therefore, the program update processing unit 2300 judges that an update is required.

Having judged that an update is required, the program update processing unit 2300 makes a comparison between pieces of program update information in order to select and determine which of the programs need an update.

The way in which the program update processing unit 2300 determines which of the programs need an update is the same as the way in which the program update processing unit 2300 determines which application needs an update. More specifically, the program update processing unit 2300 compares the update date and time 2352 in the program update information 2350 within the stored update information (See FIG. 2) with the update date and time 5252 in the program update information 5250 within the received update information (See FIG. 3). When the update date and time 5252 within the received update information is newer than the update date and time 2352 within the stored update information, the program update processing unit 2300 judges that an update is required.

In the example shown in the drawing, it is understood that the program identified with the program name 2351 "A-PROG02" needs an update.

Having judged that one or more of the programs in the application are not most-updated, the program update processing unit 2300 requests the server apparatus 5000 to transmit most-updated programs, and replaces each of the specified programs stored in the program storing unit 2500 with the received most-updated programs (Step S34).

More specifically, the program update processing unit 2300 creates another process that is separate from the application and requests the controlling unit 2100 to terminate the application so that the application is terminated once. Here, a separately-created process denotes a unit of execution that is managed by an operation system (OS).

The separately-created process takes over the processing of the program update processing unit 2300. In other words, the program update processing unit 2300 provides the separately-created process with a list of program names 2351 of the programs each of which needs an update and requests the separately-created process to update and re-activate the programs. Accordingly, the actual updating process and activation process are performed by this separately-created process.

In the separately-created process, the program update processing unit 2300 transmits the received list of the program names 2351 to the most-updated program managing unit 5200 in the server apparatus 5000 and requests the most-updated program managing unit 5200 to send back a most-updated program for each of the programs on the list (Step S35).

Having received the list of the program names, the most-updated program managing unit 5200 reads the specified programs from the most-updated program storing unit 5100 and transmits the specified programs to the program update processing unit 2300, in the separately-created process (Step S37).

Having received the most-updated programs, the program update processing unit 2300 in the separately-created process replaces the programs stored in the program storing unit 2500 with the most-updated programs.

When all the necessary updates have been performed, the separately-created process re-activates the application and terminates itself and disappears.

The application is then re-activated, and the initial process starts (Step S21).

After the initial process is performed, an authentication process is performed. The authentication process is almost the same as the authentication process for the first time, except that the authentication information to be used in the authentication process is not obtained from the user, but is read from the authentication information storing unit 2600 i.e. the file in which the authentication information has been stored.

More specifically, when the initial process has been completed, the controlling unit 2100 requests the update judging unit 2110 to judge whether or not the activation instruction is an activation instruction issued after an update of the program.

Having received the request, the update judging unit 2110 inquires of the authentication processing unit 2400 whether or not authentication information is stored in the authentication information storing unit 2600.

Since the activation instruction this time is an activation instruction issued after an update, a file exists, and the authentication information inputted during the activation process for the first time is stored in the file, which is the authentication information storing unit 2600. Accordingly, the authentication processing unit 2400 informs the update judging unit 2110 that the authentication information is stored.

Having been informed that the authentication information is stored, the update judging unit 2110 judges that the activation instruction this time is an activation instruction issued after an update, in other words, the activation instruction is issued for the second time, and returns the judgment result to the controlling unit 2100 (Step S22: Y).

Having received the judgment result from the update judging unit 2110, the controlling unit 2100 instructs the authentication processing unit 2400 to check the authentication information stored in the authentication information storing unit 2600.

Having received the instruction, the authentication processing unit 2400 reads the authentication information from the authentication information storing unit 2600 (Step S38).

The authentication processing unit 2400 then performs an authentication process based on the read authentication information (Steps S25 through S28).

When the authentication process is completed, the controlling unit 2100 performs an updating process.

The updating process is the same as the updating process performed during the activation process for the first time (Steps S29 through S34). It should be noted however that the application in the client apparatus 1000 has been updated to a most-updated one, it is judged that there is no need to update the programs (Step S33: Y). Then, the controlling unit 2100 requests the program executing unit 2200 to execute the programs, and the program executing unit 2200 executes the programs (Step S39).

As additional information, when it has been judged that it is necessary to update one or more of the programs, an updating process will be performed (Steps S34 through S37).

During a termination process, which is performed when the application is terminated, the file in which the authentication information is stored is deleted (FIG. 4; Step S14). More specifically, the authentication processing unit 2400 receives, from the controlling unit 2100, an instruction to delete the file and deletes the file.

Supplementary Information

So far, explanation on an embodiment of the program execution system of the present invention has been provided; however, it is possible to modify some parts of the embodiment. Needless to say, the invention is not limited to the above-mentioned embodiment.

(1) In the embodiment above, the programs are updated when the application is activated; however, it is also acceptable to have an arrangement wherein it is possible to update the programs under the user's instruction even while the user is in the middle of work with the use of the application.

In such a case, if some of the programs in the application are being executed, the controlling unit 2100 informs the program executing unit 2200 that the execution of such programs need to be stopped, and after the execution of the programs are stopped, the updating process will be performed. It should be noted that before the execution of the programs is stopped, a process of saving the user's own files should be performed.

(2) In the embodiment, the programs are updated automatically; however, it is acceptable to have an arrangement wherein the programs are updated only when the user permits the program to be updated.

Figure 7:
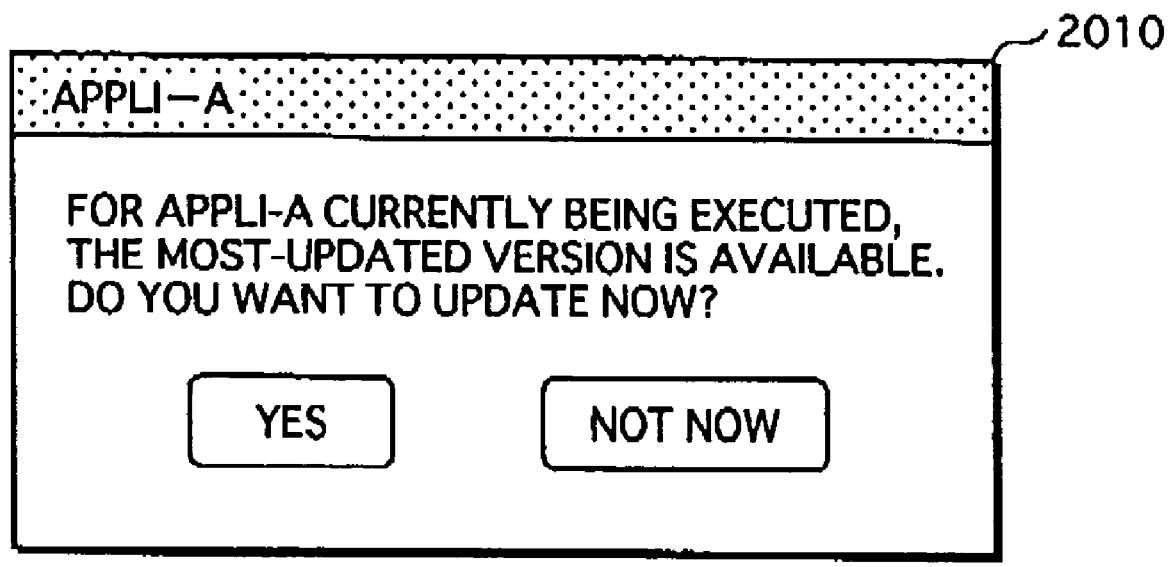
FIG. 7 shows an example of the window for an inquiry of whether an updating process needs to be performed or not.

For example, a window for an inquiry of whether an updating process needs to be performed, as shown in FIG. 7, is displayed so that the user's permission can be obtained. In such a case, the client apparatus 1000 includes an update permission receiving unit that is operable to display a window as shown in FIG. 7 and obtain an input from the user, and the controlling unit 2100 makes an inquiry as to whether an update is permitted and requests the program update processing unit 2300 to perform an update when an update is permitted.

It is further acceptable to have an arrangement wherein, even in a case where an updating process is performed only in accordance with the user's permission, an updating process is automatically performed when updates of one or more of the programs are required for using the application. For example, when a table structure in a data base has been changed, it becomes necessary to update a program that refers to the table.

(3) In the embodiment above, it is judged whether or not the programs are the most-updated ones, when an activation instruction is issued after an update, i.e. when an activation instruction is issued for the second time; however, it is acceptable to have an arrangement wherein an updating process for the second time is not performed.

In such a case, there is an advantageous effect that it is possible to shorten the time taken for the activation for the second time. On the other hand, when an updating process is performed also when the activation instruction is issued for the second time, there is an advantageous effect that it is possible to regularly keep the programs most-updated.

(4) In the embodiment, after an updating process for the programs is completed, the application is immediately re-activated automatically; however, it is also acceptable to have an arrangement wherein a process of requesting authentication information from the user is not performed in a case where the user re-activates the application within a predetermined period of time, e.g. ten minutes, from completion of an updating process.

The reason for this arrangement is because the user does not necessarily stay in front of the client apparatus waiting for completion of the re-activation process, while an updating process is performed. For example, when an updating process takes time, the user is not able to continue the task on which he/she has originally been working, during the updating process.

In such a case, when the updating process is completed, the application is terminated once. In such a case, it should be noted, however, that authentication information needs to be encrypted and stored in a file or the like that does not get deleted when the application is terminated. When the application is re-activated, data is read from the file and decrypted, and then, the authentication process is performed.

It is necessary to encrypt and store in the above-mentioned file, not only authentication information, but also a time at which the authentication information is inputted and such. The reason for this is because it is necessary to compare the time stored in the file with the time at which the re-activation process is performed and to judge if the application is re-activated within a predetermined period of time or not.

It should be noted that the predetermined period of time does not have to be a period after the updating process is completed; it is acceptable as long as the period is related to the activation previously performed. For example, it is acceptable to measure the period of time from the time at which a previous activation instruction is issued, or the time at which authentication information is inputted.

Figure 8:
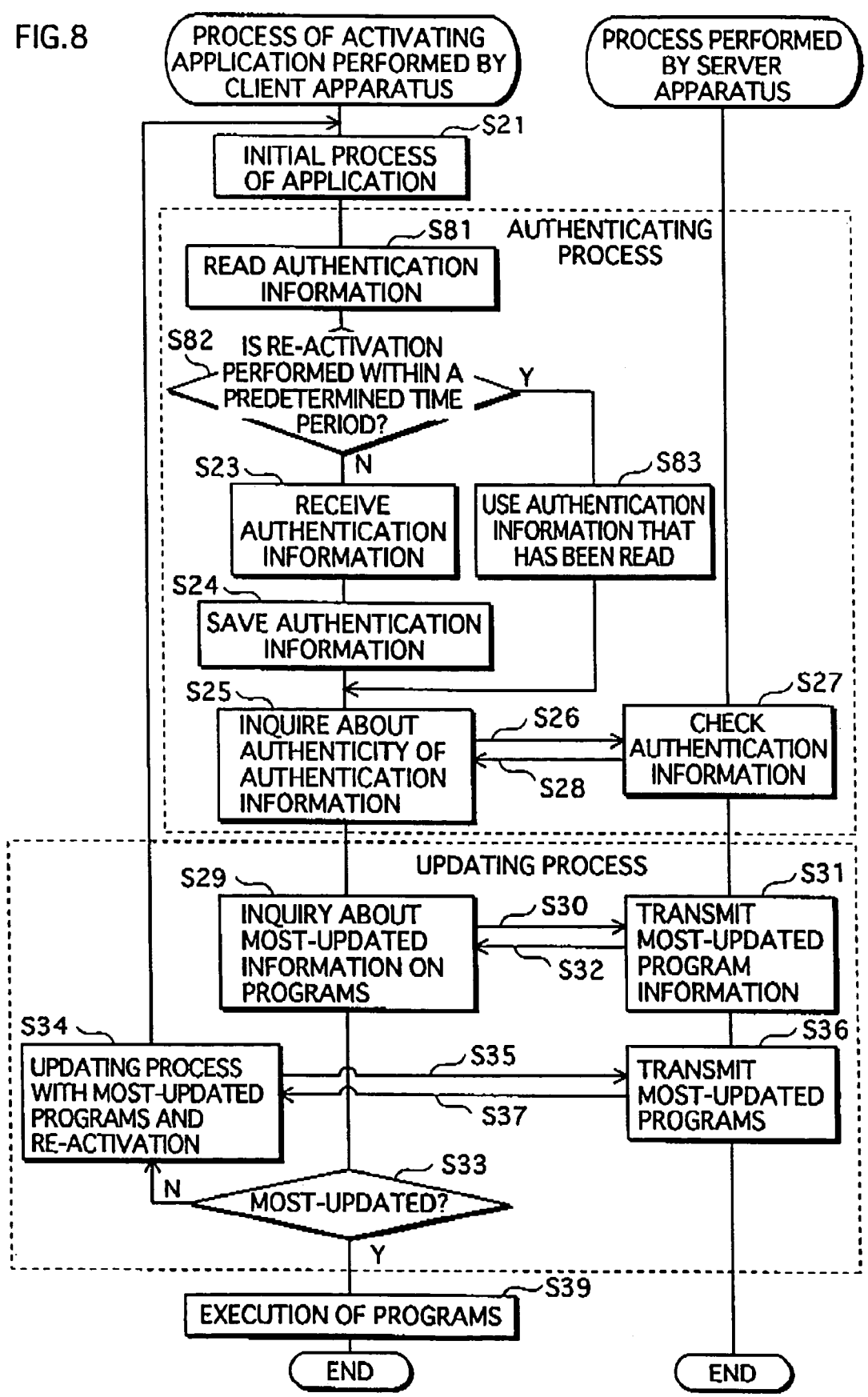
FIG. 8 is a flow chart showing the procedure in a case where a re-activation process is performed within a predetermined period of time.

The following describes the procedure in a case where an activation process is performed within a predetermined period of time from the completion of an updating process, with reference to FIG. 8. FIG. 8 is a flow chart showing the procedure in a case where a re-activation process is performed within a predetermined period of time.

The procedure is almost the same as the procedure described as the embodiment above (FIG. 5), except for the steps (Steps S81 and S82) where it is judged whether or not an activation instruction is for re-activating the application, and the way in which the authentication information to be used in the authentication process is requested (Step S83).

Having received an activation instruction, the controlling unit 2100 performs an initial process (Step S21), and then requests the update judging unit 2110 to judge whether or not the activation instruction is issued after one or more of the programs have been updated.

Having received the request, the update judging unit 2110 requests the authentication processing unit 2400 to read authentication information from the authentication information storing unit 2600.

Having received the request, the authentication processing unit 2400 reads authentication information from the authentication information storing unit 2600 (Step S81) and returns the read authentication information to the update judging unit 2110.

Having received the authentication information, the update judging unit 2110 extracts the point of time included in the received authentication information and judges that the activation instruction this time is not issued after the application is updated or, in other words, the activation instruction is issued for the first time, if the extracted time and the current time are apart from each other by ten minutes or longer. The judgment result is returned to the controlling unit 2100 (Step S82: N).

Having received from the update judging unit 2110, the judgment result that the activation instruction is not issued after an update, the controlling unit 2100 instructs the authentication processing unit 2400 to check the authentication information. The procedure thereafter is almost the same as the description provided in FIG. 5 (Steps S23 through S28), except that the authentication information stored in Step S22 includes a point of time at which the authentication information has been generated.

On the other hand, the update judging unit 2110 judges that the activation instruction is issued after an update if the current time is within ten minutes from the extracted time. The judgment result is returned to the controlling unit 2100 (Step S82; Y).

Having received from the update judging unit 2110 the judgment result that the activation instruction is issued after an update, the controlling unit 2100 instructs the authentication processing unit 2400 to check the authentication information that has been read out of the authentication information storing unit 2600 (Step S83).

Having received the instruction, the authentication processing unit 2400 performs an authentication process based on the authentication information that has been read (Steps S25 through S28).

After the authentication process is completed, the controlling unit 2100 performs an updating process.

(5) In the embodiment, the authentication process of the authentication information is performed by the server apparatus; however, it is acceptable to have an arrangement wherein the authentication process is performed by the client apparatus.

When the authentication process is performed by the client apparatus, there is an advantageous effect that it is possible to shorten the time required for the authentication process because the time spent for communication with the server apparatus can be omitted. On the other hand, when the authentication process is performed by the server apparatus, there is an advantageous effect that it is possible to manage a plurality of client apparatuses altogether. For example, it is possible to provide management using user IDs as to whether most-updated programs need to be transmitted in order to update the application.

(6) In the embodiment, the update judging unit 2110 judges whether any of the programs need to be updated or not, depending on whether or not authentication information is stored in the authentication information storing unit 2600, i. e. whether the specified file exists or not: however, it is acceptable to have an arrangement wherein it is judged whether an update have been performed or not with the use of flags which indicate whether programs have been updated or not.

Figure 9:
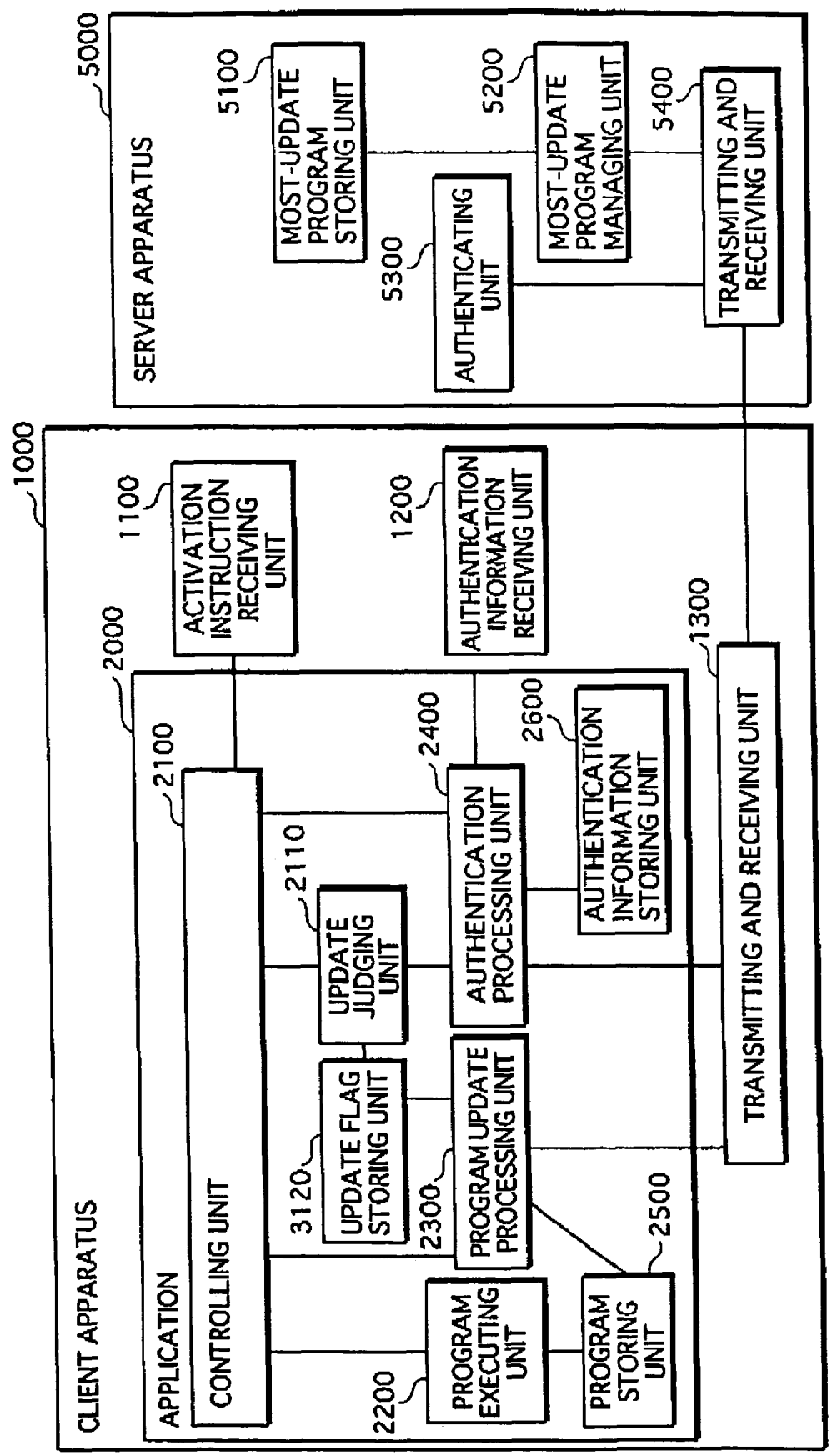
FIG. 9 is a functional block diagram showing the structure of the program execution system in a case where judgment of whether or not an update has been performed is made with the use of flags.

The following describes the procedure in a case where it is judged whether there has been an update or not with the use of flags, with reference to FIG. 9. FIG. 9 is a functional block diagram showing the structure of the program execution system in a case where judgment of whether or not an update has been performed is made with the use of flags.

The system shown in FIG. 9 is different from the arrangement of the system described as the embodiment (See FIG. 1) in that it additionally includes an update flag storing unit 3120.

The flow of the procedure is similar to the one shown in the flow chart of FIG. 5, except for the process performed in Step S22.

When the controlling unit 2100 requests the update judging unit 2110 to judge whether or not any of the programs have been update (See FIG. 5, Step S22), the update judging unit 2110 judges whether or not any of the programs have been updated based on the information recorded in the update flag storing unit 3120. The embodiment above is different from this modification example in that the judgment is made based on whether or not authentication information is stored in the authentication information storing unit 2600.

The update flag storing unit 3120 is operable to store therein information used to distinguish a state in which the programs are after an update from a state in which the programs are before an update. The information used here is sufficient as long as it is capable of distinguishing the state before an update from the state after an update, such as a one-bit piece of on/off information, a value, or a character string.

The information distinguishing the states is set by the program update processing unit 2300. When the program update processing unit 2300 has updated one or more of the programs stored in the program storing unit 2500, the program update processing unit 2300 sets the information distinguishing the states so as to indicate that an update has been performed.

Additionally, like the authentication information storing unit 2600, it is acceptable as long as the update flag storing unit 3120 exists when information is saved during the activation for the first time, and is referable when the application is activated for the second time after the termination of the application at the end of the first execution.

For example, the following explains the case where the update flag storing unit 3120 is a file, and the information distinguishing the states is a one-bit piece of data: When the application is activated for the first time, the file is generated, and the bit which is the information distinguishing the states and is stored in the file is turned off. When the program update processing unit 2300 has updated one or more of the programs, the program update processing unit 2300 turns the bit on. Afterwards, during a terminating process to terminate the re-activated application, the file is deleted. Specifically, when the bit is on, it means that one or more of the programs have been updated; therefore, when the bit is on, the update judging unit 2110 judges that one or more of the programs have been updated.

(7) In the embodiment, when the application is re-activated, the authentication process is performed using the stored authentication information; however, it is acceptable to have an arrangement wherein when the application is re-activated, no authentication process is performed.

Figure 10:
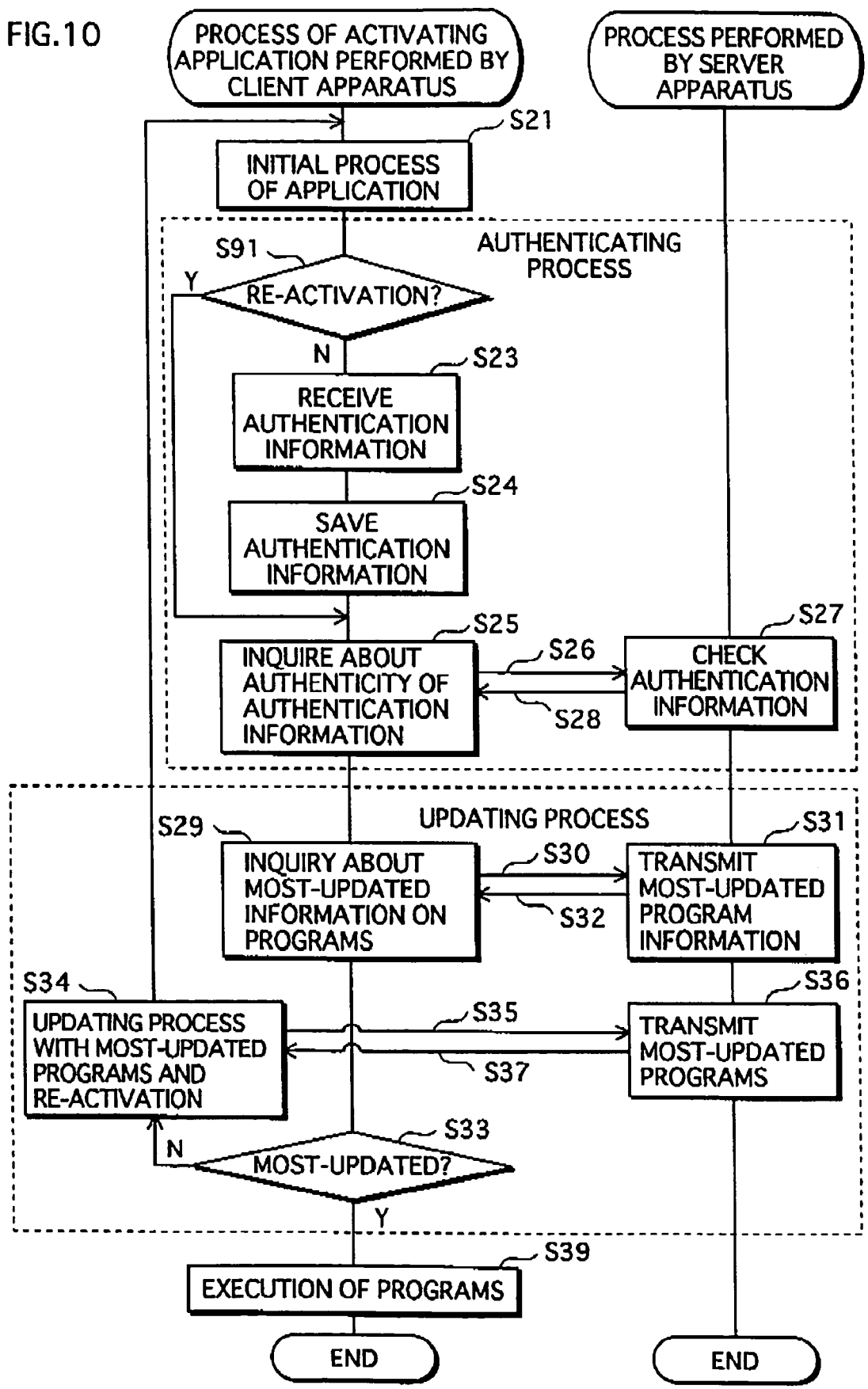
FIG. 10 is a flow chart showing the procedure in a case where no authentication process is performed during the re-activation process.

The following describes the procedure in a case where no authentication process is performed when the application is re-activated after an updating process, with reference to FIG. 10. FIG. 10 is a flow chart showing the procedure in a case where no authentication process is performed when the application is re-activated.

This modification example is similar to the procedure described as the embodiment (See FIG. 5), except that, it is different with respect to the process performed in a case where, during a process of judging whether the activation is a re-activation or not (Step S91), the activation has been judged to be a re-activation (Step S91: Y).

When it is judged that the activation is a re-activation, an updating process is performed without having an authentication process performed (Steps S29 through S37).

The embodiment is different from this modification example in that an authentication process is performed (FIG. 5: Step S38, Steps S25 though S28) before an updating process is performed.

(8) In the embodiment, explanation is provided on updating the programs in the application; however, it is acceptable to apply the present invention to an updating process for the programs of an operating system (OS).

In such a case, it is necessary to provide instructions so that after an instruction for having the OS terminated, an instruction for having the OS activated is written, so that re-activation is performed.

(9) In the embodiment, the authentication information storing unit 2600 is a file; however, it is acceptable that the authentication information storing unit 2600 is a memory, or the like.

It is necessary to refer to the authentication information storing unit 2600 when the activation for the second time is performed. Accordingly, it is necessary to have an arrangement wherein the second activation is performed by a separately-created process, and authentication information is stored in the memory within the separately-created process so that the authentication information is transferred to the application as a parameter or the like, during the second activation process.

(10) In the embodiment, an activation process after an update is performed by a separately-created process; however, it is acceptable to have an arrangement wherein it is possible to update one or more of the programs without having to terminate the application, and if a re-activation is necessary, the application requests the operation system (OS) to re-activate the application within seconds, so that the application is once terminated.

In such a case, within seconds after the termination of the application, the OS activates the application, and an initial process is performed.

(11) In the embodiment, it is judged whether or not it is necessary to update any of the programs by referring to the update date and time of each of the programs; however, it is acceptable to judge whether updates are necessary from other kinds of information such as version numbers of the programs.

(12) In the embodiment, each of the programs is a so-called object module; however, it is acceptable that each of the programs is a module in a library, a source code, or the like.

In such cases, the program executing unit should be arranged in accordance with the kind of the programs being used.

Additionally, when each of the programs is a module in a library, it is acceptable to have an arrangement wherein the module being part of the library is updated.

(13) It is acceptable to distribute a computer program for having a CPU execute the controlling processes (See FIG. 4) in order to realize the functions of the program execution system described as the embodiment, by way of recording the computer program onto a recording medium or via various kinds of communication channels. The recording medium may be one of an IC card, an optical disc, a flexible disc, a ROM, and a flash memory. For the actual use, the distributed computer program will be stored in a memory or the like that is provided in an apparatus and is readable by the CPU. The functions of the program execution system described as the embodiment are realized when the CPU executes the computer program.

(14) In the embodiment, the authentication process is performed with a password and a user ID; however, it is acceptable that the authentication process is performed with biometric identification, or the like.

In such a case, the authentication information to be stored is information necessary for the specific authentication method,

ADVANTAGEOUS EFFECTS OF THE INVENTION

As explained so far, the present invention provides a program execution system having an authentication function comprising: a storing unit operable to store therein one or more pieces of authentication information; an instruction obtaining unit operable to obtain an activation instruction to activate a program; an updating unit operable to update the program partially or entirely; a judging unit operable to judge whether or not the obtained activation instruction has resulted from an update of the program performed by the updating unit; an authenticating unit operable to, when the judging unit has judged in the affirmative, check whether or not a corresponding one of the pieces of authentication information is authentic; and an executing unit operable to execute the program in a case where the checked piece of authentication information has been confirmed to be authentic.

It is possible to achieve an advantageous effect of the present invention with the program execution system further comprising an authentication information obtaining unit operable to obtain a piece of authentication information from outside of the program execution system, wherein when the judging unit has judged in the negative, the authentication information obtaining unit obtains a piece of authentication information from the outside, and the authenticating unit checks whether or not the obtained piece of authentication information is authentic.

The present invention further provides a program execution system having an authentication function, comprising: a storing unit operable to store therein one or more pieces of authentication information; an instruction obtaining unit operable to obtain an activation instruction to activate a program: an updating unit operable to update the program partially or entirely; a judging unit operable to judge whether or not the obtained activation instruction has resulted from an update of the program performed by the updating unit; and an authentication and execution unit operable to, (i) when the judging unit has judged in the affirmative, execute the program and (ii) when the judging unit has judged in the negative, obtain a piece of authentication information from outside of the program execution system and further execute the program in a case where the obtained piece of authentication information has been confirmed to be authentic.

The program execution system of the present invention with the aforementioned arrangement makes it possible to judge whether or not an activation of the application has resulted from an update of any of the programs, when an activation instruction from the user is received; therefore, when an activation is a re-activation after an update, it is possible to re-activate the application without bothering the user to input a password, or the like.

It is further acceptable to have an arrangement wherein the authentication information obtaining unit stores the piece of authentication information obtained from the outside into the storing unit, and the judging unit judges in the affirmative when at least one of the pieces of authentication information stored in the storing unit corresponds to the program which is instructed to be activated, and judges in the negative when none of the pieces of authentication information stored in the storing unit corresponds to the program which is instructed to be activated.

With this arrangement, after the user inputs authentication information, the authentication information is stored; therefore, when authentication information is stored, it means that authentication information has already been received. Thus, it is possible to avoid requesting authentication information from the user again.

It is acceptable to have an arrangement wherein each of the pieces of authentication information stored in the storing unit includes time information which specifies a predetermined point of time, and the judging unit judges in the affirmative when both of the following are satisfied: (i) at least one of the pieces of authentication information stored in the storing unit corresponds to the program which is instructed to be activated and (ii) the activation instruction to activate the program is obtained within a predetermined period of time from the predetermined point of time specified in the time information included in the corresponding piece of authentication information.

With this arrangement, it is possible to find out if the application is re-activated within a period of time from the activation process performed last time; therefore, even in a case where the re-activation process is performed not automatically but by the user, it is possible to judge that an activation is an activation for the first time, unless it is performed within the predetermined period of time from the last activation, so that authentication information is requested from the user.

It is acceptable that the program execution system further comprises an update information storing unit that stores therein update information indicating whether or not the updating unit has performed an update, wherein every time the updating unit has performed an update, the update information is set so as to indicate that the updating unit has performed an update, the judging unit judges whether or not the obtained activation instruction has resulted from an update of the program performed by the updating unit, by referring to the update information.

With this arrangement, when one or more of the programs of the application have been updated at a client terminal, the information indicating that the application has been updated is stored; therefore, it is possible to judge whether or not the current activation is a re-activation resulting from updates of one or more of the programs, by referring to the information.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A program execution system comprising:

an activating unit configured to (i) upon obtaining an execution instruction to execute a program, judge whether or not authentication information is authentic and (ii) either (a) execute the program when the authentication information is judged to be authentic or (b) not execute the program when the authentication information is not judged to be authentic;

an updating unit configured to partially update the program upon obtaining an update instruction to update the program that has been executed by the activating unit;

an update information storing unit configured to store therein update information indicating whether or not the program has been updated, wherein every time the program, which has been executed by the activating unit, is partially updated, the updating unit causes the update information to indicate that the program has been updated, and every time the program is executed, the activating unit causes the update information to indicate that the program has not been updated; and an authentication information storing unit configured to store therein one or more pieces of authentication information that are inputted by a user, and input time information indicating a time when the authentication information is inputted by the user, wherein upon obtaining the execution instruction to execute the program, the activating unit judges the obtained execution instruction to be the instruction to execute the updated program for the first time in the predetermined time period from the update performed by the updating unit, only when both of the following are satisfied: (i) the update information indicates that the program has been updated; and (ii) the execution instruction is obtained within a predetermined time period from the time indicated by the input time information, and in a case where the obtained execution instruction is an instruction to execute the updated program for a first time in a predetermined time period from the update performed by the updating unit, the activating unit judges whether or not the authentication information stored in the authentication information storing unit is authentic, and in another case where the obtained execution instruction is not the instruction to execute the updated program for the first time in the predetermined time period from the update performed by the updating unit, the activating unit obtains the authentication information from outside of the program execution system, judges whether or not the obtained authentication information is authentic, and stores the obtained authentication information into the authentication information storing unit.

2. The program execution system of claim 1, wherein the one or more pieces of authentication information that is inputted by the user and the input time information are encrypted when stored in the authentication information storing unit.

3. The program execution system of claim 2, wherein the one or more pieces of authentication information that is inputted by the user and the input time information are decrypted before the activating unit judges whether or not the authentication information stored in the authentication information storing unit is authentic.

* * * * *